United States Patent Office 2,939,227
Patented June 7, 1960

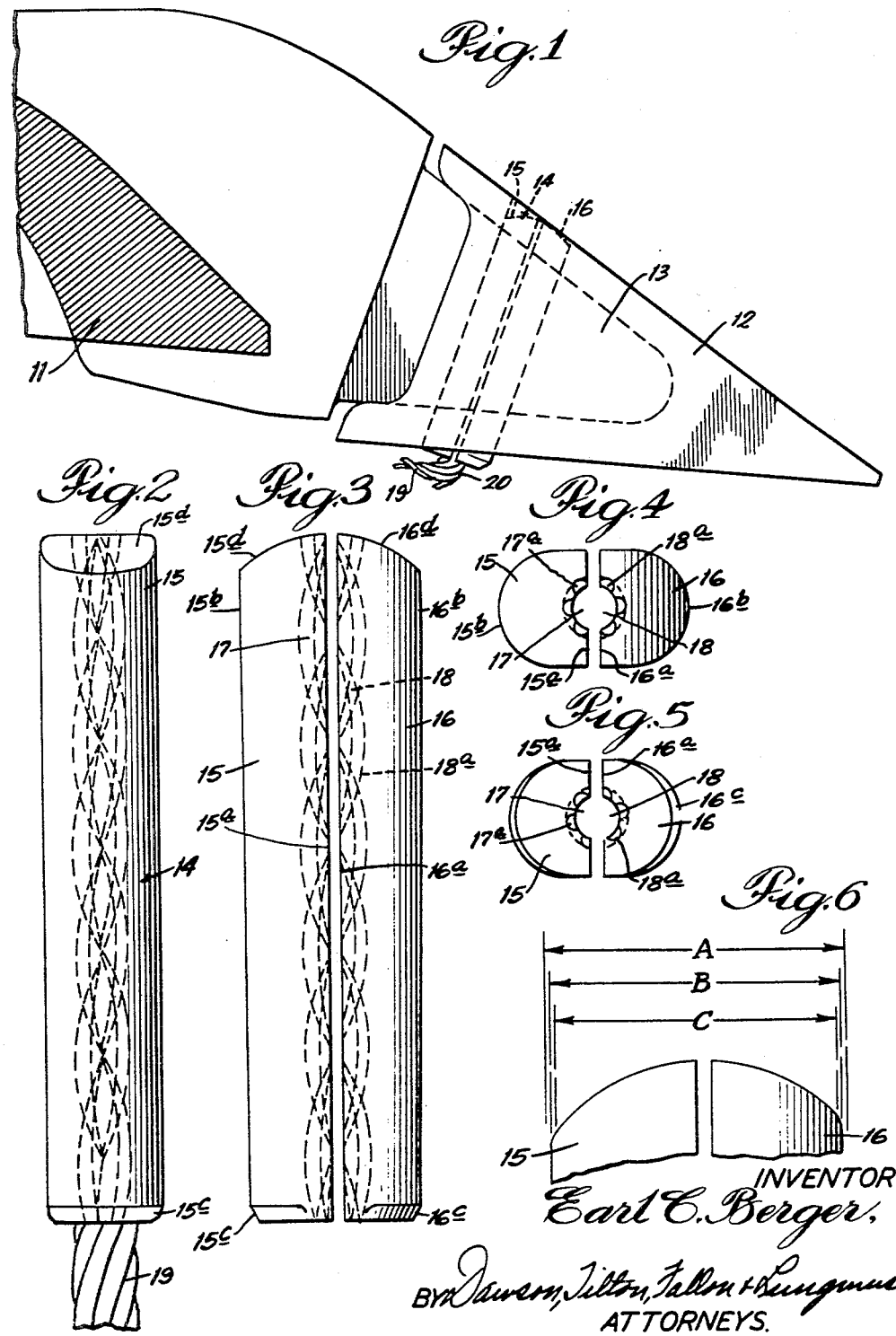

2,939,227

MEANS FOR SECURING EXCAVATING TOOTH

Earl C. Berger, Danville, Ill., assignor to Electric Steel Foundry Company, Portland, Oreg., a corporation of Oregon Filed Mar. 21, 1958, Ser. No. 722,907

3 Claims. (Cl. 37—142)

This invention relates to a method and means for securing an excavating tooth and, more particularly, to a method and means for locking a hollow excavating tooth in place on an extended nose or adapter.

The excavating tooth with which this invention is concerned finds application in many types of earth-handling machinery such as dragline buckets, dippers, etc. In order to effectively prolong the life of such equipment, it has been the pratice for a considerable period to provide the earth-cutting surfaces with replaceable teeth. Conventionally, these teeth have been maintained in place on projections provided on the machine proper by means of keys or pins that extend through aligned openings in the tooth and the projection. So long as the tooth remains sharp and in place on the projection or adapter, the excavating machine can be operated successfully and effectively. However, because of the rough wear to which the teeth and the machine in general are subjected, such rough wear being occasioned by the cutting surfaces encountering rocks, and the like, the need often arises for replacing or resecuring a tooth in position.

If a tooth is not properly secured, the tooth can become disengaged from the adapter, with the possibility of serious damage to the machine. It is to be appreciated that the adapter or nose on which the tooth is mounted is designed and constructed for a different purpose than the tooth, so that subjecting the uncapped nose to cutting stresses might well result in serious damage and substantial down-time of the machine for repair. Thus, it is mandatory that the tooth be securely anchored on the adapter. On the other hand, an equally undesirable result stems from a situation where the tooth is unremovably anchored to the adapter. Because a tooth can become dull in short order under some conditions of operation, it is necessary that the tooth be removable for resharpening and replacement. Should the removal be difficult, again the machine loses operating time and may require the use of tools not handy in the field where the machine is being used.

It is a general object of this invention to provide a method and means for securing an excavating tooth in place that overcomes the disadvantages and problems outlined above. Another object is to provide a method and means of locking an excavating tooth in place on an adapter by means of a composite key having split pin portions. Still another object is to provide a novel locking key structure for an excavating tooth in which a portion of the key is reusable to provide a superior locking action. Yet another object is to provide a new method and means for securing an excavating tooth in place on an adapter or nose which utilizes a length of wire rope or cable included between mating faces of split pin portions that are assembled to form a composite locking key. Other objects and advantages of this invention can be seen as this specification proceeds.

This invention, in an illustrative embodiment, will be explained in conjunction with the accompanying drawing, in which Figure 1 is an elevational view, partially in section, of an assembled excavating tooth structure such as might be found in the cutting edge of a dragline bucket, dipper, etc.; Fig. 2 is a front elevational view of a composite key embodying the teachings of this invention; Fig. 3 is a side view of a composite key but without the included wire cable seen in Fig. 2; Fig. 4 is an end view of the key structure shown in Fig. 3, while Fig. 5 is an opposite end view; and Fig. 6 is a fragmentary view similar to Fig. 3.

In the illustration given, the numeral 11 designates the cutting edge portion of an excavating machine and which is seen to include a tooth or point 12 mounted on an adapter or nose 13 by means of a key designated generally as 14. Since the general arrangement of such cutting surfaces is well known, and the fact that excavating machines are equipped with a plurality of such teeth, it is believed unnecessary to go into the particulars of the machine proper in detail.

The key 14 mentioned above as securing the tooth in place on the adapter 13 can be seen in enlarged form in Figs. 2–5. There, key 14 is seen to include two elongated pins 15 and 16, each of which is provided with a longitudinally-extending mating surface designated 15a and 16a, respectively. When the mating surfaces 15a and 16a are brought into adjacent relation as shown, a composite key is provided that is receivable with aligned openings in the tooth and adapter to secure the tooth in place on the adapter.

Both elongated pins 15 and 16 which fit together to make up a composite key 14 are of the same length and each is seen to have a similar cross-sectional configuration at corresponding points along the length of the composite key 14. The cross-sectional area of each pin decreases in traveling from one end to the other by virtue of a narrowing or tapering of the pin. For example, this can take the form of a taper of three-eights of an inch per foot where a nine inch long key is employed.

Although the cross-sectional configuration at corresponding points along the length of pins 15 and 16 are similar, they are not identical, since one pin (here pin 15) is wider than the other, namely, pin 16. Each pin is seen to have a hemi-cylindrical surface, 15b and 16b, respectively, disposed opposite to the mating surfaces, 15a and 16a, respectively. In the case of pin 15, the hemi-cylindrical surface 15b is spaced farther away from mating surface 15a than is hemi-cylindrical surface 16b from its associated mating surface 16a. Also the cylindrical surfaces 15b and 16b are inclined slightly with respect to the mating surfaces 15a and 16a so as to provide the taper in the composite key 14 mentioned above. Each pin is beveled at the shorter end thereof, as is designated by the numerals 15c and 16c, respectively. The larger end is rounded as at 15d and 16d, respectively.

As a specific example, pins 15 and 16 can be 9" long, while the width of pin 15 can be 1 19/64" and that of pin 16 can be 1 15/64", the width being measured at the large end of each pin. Together, pins 15 and 16 can provide a composite key 14 having an overall width of 2 17/32" such as is designated by the letter B in Fig. 6. Because of the essential similarity of the pins in their mating and cylindrical surfaces, it is to be appreciated that two identical pins such as either pins 15 or 16 can be employed to make up a composite key 14. For example, when two pins, each like pin 16, are employed for this purpose, the composite key has an overall width of 2 15/32", as indiacted by the letter C in Fig. 6. Where two pins 15 are employed, the overall width is 2 19/32", as indicated by the letter A in Fig. 6.

In operation, a set of pins are provided which may contain a number of pins of different widths. By selecting appropriate pins and combining them to form a composite key 14, any given opening in an assembled tooth and adapter can be snugly filled with a composite key. After the assembled tooth and adapter has been subjected to wear, the composite key can be readily removed, either because it is loose in its fitting due to enlargement of the opening, or wear on the bearing surfaces of the key, or because the split character of the key permits preferential loosening operations on one pin or the other. The latter is especially desirable since generally a key will not be fused or bonded uniformly about its periphery in an opening. After removal of the composite key 14 from the aligned openings in the adapter 13 and tooth 12, a larger-sized composite key 14 can be provided by replacing one of the split pin portions with the next larger sized split pin portion. This has the advantage of re-utilizing a previously employed split pin portion which not only effectuates savings, but also provides a superior locking surface, particularly in the area of the hemicylindrical surface. It is to be appreciated that wear on the previously employed split pin portion occurs unevenly, as it also does in the aligned openings in the tooth and adapter so that, in effect, a series of anchors or locking areas is provided that when the previously employed split pin portion is reused, an unexpectedly superior locking fit is brought about in contrast to that which would be developed by inserting a smooth new unitary key. The matter of economy also cannot be lightly dismissed, since many machines are equipped with a large number of teeth, necessitating a substantial inventory of replacement keys.

Excellent results are achieved when the mating surfaces 15a and 16a of pins 15 and 16, respectively, are equipped with longitudinally-extending recesses, as indicated by the numerals 17 and 18. In the generally circular recess provided by the cooperation of recesses 17 and 18, a wire rope or cable 19 is positioned, the rope being of a length greater than the length of the composite key 14 and extending outwardly of the smaller end thereof, as is designated by the numeral 20. The extended portion 20 of the cable 19 unwinds because of its unsupported condition, and serves as a key lock. The presence of cable 19 between pins 15 and 16 serves to urge pins 15 and 16 apart because of the generally resilient nature of cable 19 and thereby further anchors the composite key 14 in place within the aligned openings in tooth 12 and adapter 13.

Through the use of cable 19, an additional advantage is secured in that where the composite key 14 is no longer snugly received within the aligned openings, it can be effectively enlarged by the introduction of the next larger size of wire rope. For example, a 1" diameter wire rope fitting between pins 15 and 16 could be replaced with a 1⅛" diameter rope without the need of immediately replacing one of the pins.

To further maintain cable or wire rope 19 substantially immovably in place between pins 15 and 16, each recess 17 and 18 is equipped with a lead, designated 17a and 18a, respectively, that corresponds to the lead or outer configuration of the wire rope 19. This type of recess also insures that any unwinding of the cable 19 at the extended portion 20 thereof will be confined to that portion and will not tend to unravel the wire rope all the way along its length.

While, in the foregoing specification, a detailed description of an embodiment of the invention has been given for the purpose of fully explaining the invention, it will be apparent to those skilled in the art that many variations therein can be made without departing from the spirit and scope of the invention.

I claim:

1. In an excavating tooth structure having an adapter and a tooth received on said adapter with aligned openings in said tooth and adapter, a locking key adapted to be received in said aligned openings and comprising two elongated pins having longitudinally disposed mating surfaces whereby said pins can be brought into mating relation to form a locking key, each of said pins being longitudinally tapered, recess means in each of said mating surfaces, and cable means in said recess means.

2. The structure of claim 1, in which said cable means extends beyond the smaller end of the locking key provided by mating said pins with their tapers decreasing in the same direction.

3. The structure of claim 1, in which the said recesses are equipped with leads conforming to the lead in said cable means.

References Cited in the file of this patent

UNITED STATES PATENTS

| 995,285 | Pemberton | June 13, 1911 |
| 1,767,713 | Standfuss | June 24, 1930 |
| 2,716,822 | Launder et al. | Sept. 6, 1955 |

FOREIGN PATENTS

| 490,651 | Canada | Feb. 17, 1953 |